Figure 5:
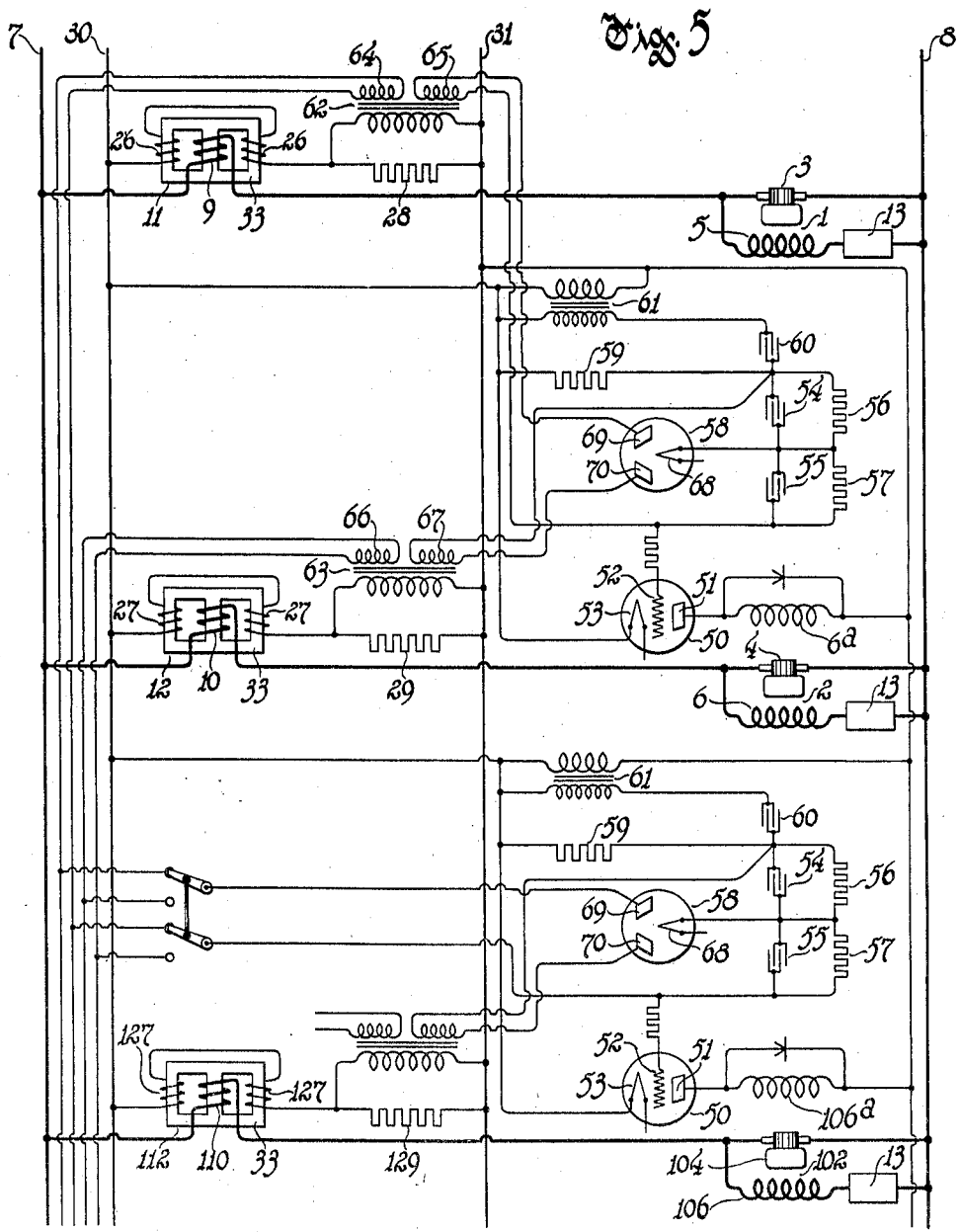

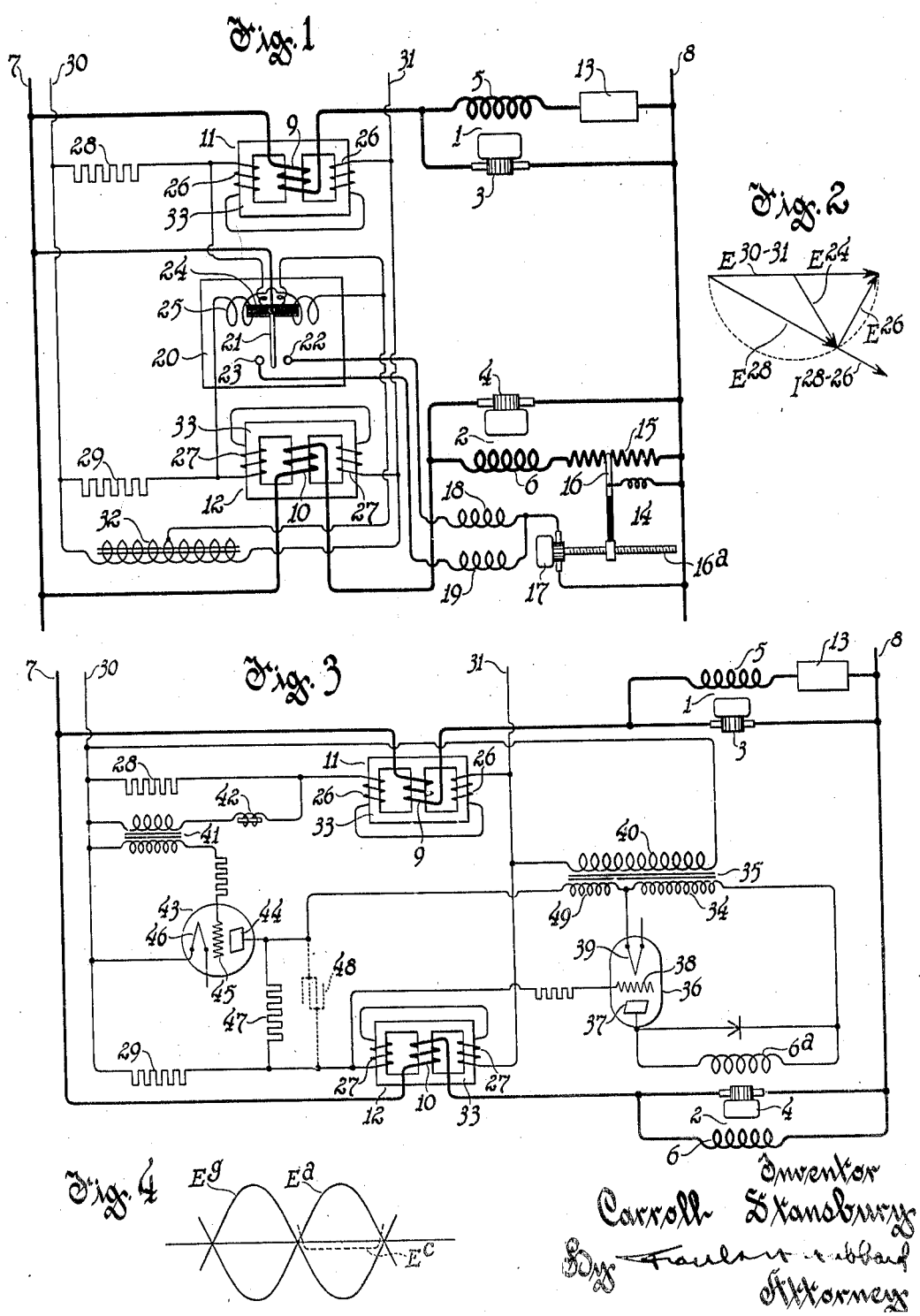

Feb. 6, 1934.      C. STANSBURY      1,945,831
CONTROL FOR DYNAMO ELECTRIC MACHINES
Filed April 20, 1933      2 Sheets-Sheet 2

Inventor
Carroll Stansbury
By Frank Hubbard
Attorney

Patented Feb. 6, 1934

1,945,831

UNITED STATES PATENT OFFICE 1,945,831

CONTROL FOR DYNAMO-ELECTRIC MACHINES

Carroll Stansbury, Wauwatosa, Wis., assignor to Cutler-Hammer, Inc., Milwaukee, Wis., a corporation of Delaware Application April 20, 1933. Serial No. 666,993

15 Claims. (Cl. 171—312)

This invention relates to the control of the input of electric translating devices and more particularly to the control of the division of load in systems wherein several translating devices are operated in parallel on the same load.

More particularly, the invention relates to the control of the load current of two or more electric motors which are coupled to the same mechanical load, so that for any load demand, each motor carries a given ratio of the total load.

If, for example, two or more direct current motors are mechanically coupled to a common load, the load carried by each machine is affected by various well known factors which tend to shift part of the load from one machine to another even where the motors are of identical design and are initially adjusted to carry the same load. It is almost impossible to regulate and adjust them in such a manner that the load division remains permanent during the operation of the machines. Various means have been proposed to remedy this defect but all methods disclosed heretofore are complicated and are generally effective only over a narrow range of load and speed of the motors. Similar difficulties are encountered where several constant speed generators or several converters are feeding into the same bus bars.

The present invention has for its object to provide for the regulation of the division of load between two or more translating devices whereby the load distribution between the various devices may be adjusted at will for a given ratio and whereby this ratio is maintained accurately, even though the total load of all the devices or other conditions of power translation varies.

Another object is to provide a regulator of the aforementioned type which affords a simple method of varying the division of load between the different translating devices.

Another object is to provide a control of the aforementioned type which permits the grouping of various devices carrying a common load in any desired manner and maintain their load ratio constant.

Another object is to provide a controller of the aforementioned type wherein the division of load between various dynamic electric machines is maintained at the desired value for different speeds of the machines.

Another object is to provide a controller of the aforementioned type which is simple and which permits of easy adjustment and control from a distance.

Other objects and advantages will hereinafter appear.

The accompanying drawings illustrate an embodiment of the invention together with certain modifications thereof, which will now be described, it being understood that the embodiment illustrated is susceptible of other modifications without departing from the spirit and scope of the appended claims.

Figure 6:
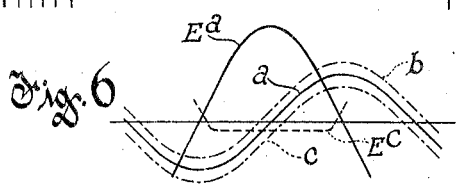

In the drawings,

Figure 1 is a diagram of a system embodying my invention wherein the ratio of the loads carried by two direct current motors is maintained constant, Fig. 2 is a vector diagram of certain voltages and currents in the system shown in Fig. 1, Fig. 3 is a modification of the system illustrated in Fig. 1, Fig. 4 is a diagram of certain instantaneous voltages in the system shown in Fig. 3, Fig. 5 is still another modification of the system illustrated in Fig. 1, and Fig. 6 is a diagram of the instantaneous voltages operative in the system shown in Fig. 5.

Referring to Fig. 1, two motors 1 and 2 having armatures 3 and 4 and field windings 5 and 6 respectively are supplied from a direct current supply line 7 and 8. In series with the armature 3 is a coil 9 of a magnetic amplifier 11 and a similar coil 10 of a magnetic amplifier 12 is connected in series with the armature 4. In series with the field winding 5 is a field regulator 13 which may be of any suitable type. In series with the field winding 6 is a motor operated field regulator 14 having a variable resistor element 15, a contact brush 16 movable over the resistor 15 for adjustment thereof by means of a screw 16ª which, in turn, is driven by the armature 17 of a reversible motor which has the two field windings 18 and 19.

The windings 18 and 19 are energized selectively to cause rotation of the armature 17 in opposite directions. The controller also includes a relay 20 which comprises a movable armature or contact member 21 and cooperating stationary contacts 22 and 23. The movable armature 21 is under the influence of a field created by coils 24 and 25. These coils are arranged in such a manner that when alternating currents, which are in phase with each other, pass through the coils, no torque is produced on the armature 21 whereas a difference in phase between the currents flowing through the two coils produces a torque upon the armature in one direction or the other and it makes contact with the stationary contacts 22 or 23. The motor winding 18 is connected to the contact 22, while the winding 19 is connected to the contact 23. The magnetic amplifier 11 consists of a magnet frame 33 having on its center leg the coil 9, while the two outer legs carry two series connected coils 26. If a direct current is passed through the core 9, the saturation of the iron core is varied and this, in turn, varies the impedance to the flow of current in the coils 26. The magnetic amplifier 12 is constructed similar to the amplifier 11.

The coils 24 and 25 are connected into an alternating current bridge circuit which is fed from alternating current lines 30 and 31 as follows: Connected across the lines 30 and 31 are the coils 26 in series with a non-inductive resistance 28 and similarly the coils 27 are in series with a non-inductive resistance 29. The coils 24 and 25 are connected in series between common terminals of the coils 26 and resistance 28 and coils 27 and resistance 29, respectively. An impedance or auto-transformer 32 is connected across the lines 30 and 31 and the midpoint of said impedance is connected to the common terminal of the coils 24 and 25.

The operation of the system illustrated in Fig. 1 is as follows: When the lines 30 and 31 are energized, the voltage between the lines 30 and 31 may be represented by the vector $E^{30-31}$ of Fig. 2. The voltage drops across resistance 28 or resistance 29, which are equal, may be represented by $E^{28}$, while the voltages across coils 26 or 27, which are also alike, may be represented by the vector $E^{26}$, and the current flowing between the lines 30 and 31 through the coil 26 and resistor 28 may be represented by the vector $I^{28-26}$. In drawing this diagram, the resistances of the coils 26 and 27 are neglected as they are low in comparison to their reactances. The voltage which is impressed upon the coil 24 is the resultant of the voltage across the resistance 28 and half of the line voltage $E^{30-31}$ and is represented by $E^{24}$ in the diagram. This is approximately correct because the impedances of the coils 24 and 25 are very large in comparison with the impedance of the rest of the circuit. The voltage diagram for the coil 25 is similar to that just described in connection with coil 24 as is obvious. As a result, the voltages impressed upon coils 24 and 25 are in phase and the armature 21 remains in the neutral position. If now there is a difference in the impedance of the coils 26 and 27 due to a change in the excitation of the coils 9 and 10, the phase relation of the voltages in the coils 24 and 25 changes so as to cause the armature 21 to engage contact 22 or 23 and to energize the motor armature 17 either through the field winding 18 or 19 and thus produce a change in the field resistance 15 and therefore of the excitation of the motor 2.

The coils 9 and 10 are wound with such a number of turns that when the currents and thus the loads of the two dynamo electric machines 1 and 2 have the desired ratio, the impedances of the coils 26 and 27 are equal and since the resistances 28 and 29 are also equal, the voltages in the coils 24 and 25 are in phase and the armature 21 is in its neutral position so that the motor armature 17 stands still. If now, for any reason, the load on the motor 2 should increase, its armature current also increases, causing an increase in the saturation of the magnetic amplifier 10 and a resulting decrease in the impedance and, therefore, the voltage of the coils 27. This results in a difference in phase between the voltages of coils 24 and 25 of relay 20 and, as aforedescribed, the armature 21 closes the circuit of field winding 18 or 19 thereby starting the motor armature 17 and causing a variation of the field resistance 15 and the corresponding current in the field winding 6. This, in turn, produces a variation of the current of motor 2 so that it will carry again its proper share of the load. If the total load during this regulating period remains constant, an increase or decrease in the load carried by motor 2 will, of course, cause a corresponding decrease or increase of the load carried by motor 1. This, through change of the magnetization of the coil 9, changes the impedance of coils 26 of the amplifier 11, thereby producing a phase difference between the voltages of the coils 24 and 25 in a sense opposite to that produced by a similar change in the load of motor 2 and this again causes a variation of the field resistance 15 and a corresponding adjustment of the load carried by motor 2 until the desired balance is established.

Referring now to Fig. 3, this shows a modification of the system illustrated in Fig. 1, wherein the phase responsive relay 20 of Fig. 1 is replaced by a vapor electric discharge device 43 which, in turn, controls a second similar discharge device 36 which latter device regulates the auxiliary $6^a$ of motor 2. In Fig. 3 the auxiliary field winding $6^a$ of motor 2 is supplied with current from the secondary winding 34 of a transformer 35 whose primary winding 40 is connected across alternating current supply lines 30 and 31. In series with the field winding is the discharge device 36 having an anode 37, a grid 38 and a cathode 39.

Connected in parallel with the aforedescribed resistor 28 is the high impedance primary winding of a transformer 41 in series with a reactor 42. The secondary winding of the transformer 41 is connected in the grid circuit of a gaseous discharge device 43, having an anode 44, a grid 45 and a cathode 46. A circuit consisting of a resistor 47 of a relatively high ohmic value is connected between the anode 44 of the discharge device 43 and the grid 38 of the discharge device 36. If desired, a condenser 48 may be connected in parallel with the resistor 47. The grid circuit of the discharge device 36 includes a secondary winding 49 of transformer 35 and the resistor 47.

The operation of the system shown in Fig. 3 is as follows: If the armature currents of motors 1 and 2 have the desired relation, the impedances of the coils 26 and 27 are equal and the voltages across the resistors 28 and 29 are in phase. If the effect of the condenser 48 and the reactor 42 be temporarily neglected, the voltage impressed upon the grid of the discharge device 43 is 180° out of phase with the anode voltage thereof and the voltage relations are as indicated in Fig. 4, wherein $E^a$ is the anode voltage of the device 43, $E^g$ is the grid voltage, and $E^c$ the critical grid potential below which the grid must be kept to prevent starting of current flow between anode 44 and cathode 46. If the conditions are as shown in Fig. 4, the tube 43 is non-conductive and there is therefore no voltage drop across the resistor 47 so that grid 38 of device 36 is only subjected during the positive half cycle to a negative voltage derived from the transformer winding 49. This voltage keeps the device 36 non-conducting. Under these conditions the current in the field winding $6^a$ decreases, thereby reducing the counter-electromotive force of the armature 4 of motor 2. This, in turn, increases the armature current and the current in coil 10 and this produces a decrease of the reactance of winding 27. The latter produces a difference in phase of the voltage drop across the resistor 29 relative to that across the resistor 28, so that the phase angle between the grid voltage and the anode voltage of tube 43 changes from 180° and the tube becomes conductive. When the tube 43 conducts current, a voltage drop is produced through the resistance 47, this voltage drop being in opposition to the voltage of the winding 49. Thus the negative potential of the grid 36 is reduced and the grid becomes positive and the tube 36 conductive during the positive half cycle. This results in an increase in the current in the field winding 6a with opposite effects to those just described. As a result, the tube 43 continuously alternates between a conductive and a non-conductive condition and holds the average field strength of motor 2 at the proper value to balance the currents in the armature 1 and 2.

As aforedescribed, the variation of the armature current of motor 1 when driving the same load as motor 2, causes a reverse effect upon the current of armature 3. Variations in the current in armature 3 causes a decrease of the impedance of the coils 26 of the amplifier 11, thereby varying the voltage drop through the resistance 28, which causes a shift in phase of the grid potential of grid 45 relative to that of the plate potential of the tube 43, thereby initiating a regulating action which is obvious from the aforementioned.

An inductance 42 in series with the primary winding of the transformer 41 may be provided to shift the anode and grid voltages under balanced conditions slightly more than 180°, which is desirable for reasons obvious from an inspection of Fig. 4. The purpose of the condenser 48 is to prolong the period during which the voltage drop across the resistance 47 is effective in the circuit of the grid 38 to facilitate the more positive control of the tube 36.

Fig. 5 embodies still another modification of my invention, wherein the load of two or more dynamo electric machines is controlled by means of reactors which respond to the current of the machines, while the amplitude of the voltage drops across these reactors are employed to produce the desired regulating effect.

The system illustrated comprises three motors 1, 2 and 102 which are adapted to be coupled to a single load such as three mechanically coupled sections of a printing press. The motor 1 has an armature 3, connected across the lines 7 and 8 in series with the direct current winding 9 of a magnetic amplifier 11, and a field winding 5 connected across the same lines in series with a conventional field rheostat 13 of any desired type. The motor 2 has an armature 4 which is connected in series with a direct current winding 10 across the lines 7 and 8, and a shunt field winding 6 connected across the same lines. The motor 2 has also an auxiliary field winding 6a, the connection of which will be explained hereafter. The motor 102 is similar in construction and its connections are identical to those of motor 2, as is obvious from the drawing, so that it needs no further explanation.

Connected across an alternating current line 30 and 31 are the alternating current coils 26 and 27 of the magnetic amplifiers 11 and 12, respectively, in series with the noninductive resistances 28 and 29, respectively. A transformer 61 has its primary winding connected across the lines 30 and 31, while its secondary winding is shunted across the series connected resistance 59 and condenser 60. A transformer 62 has its primary winding connected across the resistance 28, and is equipped with secondary windings 64 and 65, while a similar transformer 63 has its primary winding connected across the resistance 29 and is equipped with secondary windings 66 and 67 which are identical to the windings 64 and 65, respectively.

The field winding 6a is connected across the lines 30 and 31 in series with a gaseous electron tube 50, having an anode 51, a grid 52 and a cathode 53 which is of the heated type and may be supplied with heating current from any desired source. Two condensers of equal capacity 54 and 55 are connected in series between the grid 52 and the common terminal of resistance 59 and condenser 60. The condensers 54 and 55 are paralleled by leak resistances of a high ohmic value 56 and 57, respectively. Connected to the common terminal of the condensers 54 and 55 is the cathode 68 of a gaseous electron tube 58 which is also provided with two anodes 69 and 70. The winding 65 is connected between the anode 69 and the grid 52, while the winding 67 is connected between the anode 70 and the common terminal of condensers 54 and 60. The windings 64 and 66 are connected to common bus bars together with similar windings of transformers coordinated similarly to other motors, such as motor 102.

The operation of the system in Fig. 5 will now be described with respect to motors 1 and 2. The operation with respect to motor 102 will be obvious.

Let it be assumed that the armature currents of motors 1 and 2 are equal. If the amplifiers 11 and 12 are of the same design, and the resistances 28 and 29 are equal, the voltage drop across these resistances and hence the voltage impressed upon the transformers 62 and 63 will also be equal. The potentials of the condensers 54 and 55 which depend upon the peak voltages of windings 65 and 67 will then also be equal but opposite. The potential of the grid 52 with respect to the cathode 53 is the resultant of the voltages of condensers 54, 55 and 60. As the two former cancel each other, the grid voltage is equal to the voltage of condenser 60 which is 90° displaced relative to the anode voltage. In Fig. 6, $E^a$ represents the anode voltage, while $a$ is the grid voltage and $E^c$ is the critical grid voltage.

If now the current of motor 2 should increase or decrease, the voltage drop across the coils 27 of impedance 10 and hence that across resistance 29 will vary. This varies the voltage impressed on condenser 54 with the result that the amplitude of the voltage of grid 52 will be shifted as indicated by $b$ or $c$ in Fig. 6. This causes the current through tube 50 to be started earlier or later during the positive cycle with a resultant increase or decrease of the current in the field winding 6a. This, in turn, causes a corresponding change in the armature current of motor 2 and a change of the load which the motor carried until the desired balance between the loads of motors 1 and 2 is again reestablished.

It is obvious that a change in current of the motor 1 will cause similar adjustments in the voltage of grid 52 with a resultant adjustment of the motor loads. It will also be obvious that motor 102 will be controlled in a manner similar to that described and that any desired number of motors may be connected and controlled in the same way. By suitable commutating switches the system may be arranged so that motor 2 becomes the leading machine for motor 102 and many other combinations are obvious to those skilled in the art.

The fields 6ª in Figs. 3 and 5 may be paralleled by an impedance to smooth out the ripples of the regulating current.

While in describing the system illustrated in Fig. 5 it was assumed that the load currents of motors 1 and 2 be equal, it is obvious that these currents may have any desired ratio, it only being necessary to so design the control circuit, that the voltages of condensers 54 and 55 be equal when the desired ratio of loads obtains.

The system described may also be adapted to control the load current of generators of various types, of converters, rectifiers or other electrical translating devices.

What I claim as new and desire to secure by Letters Patent is:

1. In combination with two translating circuits, means for maintaining a given ratio of an operating characteristic of said circuits, said means including a variable impedance connected to each of said circuits, and adapted to vary in response to the characteristic of the respective circuit while maintaining a given ratio of said impedances for a constant ratio of said characteristics, and means responsive to departure of the ratio of said impedances from said given ratio to regulate the characteristics of one of said circuits.

2. In combination with two translating circuits, operating with a constant ratio of an operating characteristic thereof, means for maintaining a given ratio of a second operating characteristic of said circuits, said means including a variable impedance connected to each of said circuits and adapted to vary in response to said second characteristic of the respective circuit while maintaining a given ratio of said impedances for a constant ratio of said second characteristics, and means responsive to departure of the ratio of said impedances from said given ratio to regulate the second characteristic of one of said circuits.

3. In combination with two dynamo electric machines, operating with a constant ratio of an operating characteristic thereof, means for maintaining a given ratio of a second operating characteristic of said machines, said means including a variable impedance connected to each of said circuits and adapted to vary in response to said second characteristic of the respective machine, while maintaining a given ratio of said impedances for a constant ratio of said second characteristics, and means responsive to departure of the ratio of said impedances from said given ratio to regulate the second characteristic of one of said machines.

4. In combination with two dynamo electric machines carrying a common load, means for maintaining a given ratio between the loads of said machines, said means including a variable impedance connected to each of said machines and adapted to vary in response to the load of the respective machine, while maintaining a given ratio of said impedances for a constant ratio of said loads, and means responsive to departure of the ratio of said impedances from said given ratio to regulate the load of one of said machines.

5. In combination with two motors carrying a common load, means for maintaining a given ratio between the loads carried by the two motors, said means including a variable impedance connected to each of said motors and adapted to vary in response to the load of the respective motor while maintaining a given ratio of said impedances for a constant ratio of said loads, and means responsive to departure of the ratio of said impedances from said given ratio to regulate the load of one of said motors.

6. In combination with two motors mechanically coupled to a common load, means for maintaining a given ratio between the loads carried by the two motors, said means including a variable impedance connected to each of said motors and adapted to vary in response to the load of the respective motor while maintaining a given ratio of said impedances for a constant ratio of said loads, and means responsive to departure of the ratio of said impedances from said given ratio to regulate the load of one of said motors.

7. In combination with two direct current motors connected to a common load and having a regulating winding, means for maintaining a given ratio between the loads carried by the two motors, said means including a variable impedance connected to each of said motors and adapted to vary in response to the load of the respective motor while maintaining a given ratio of said impedances for a constant ratio of said loads, and means responsive to departure of the ratio of said impedances from said given ratio to control the current of the regulating winding of one of said motors.

8. In combination with two direct current motors connected to a common load and having an exciting winding, means for maintaining a given ratio between the loads carried by the two motors, said means including a variable impedance connected to each of said motors and adapted to vary in response to the load of the respective motors while maintaining a given ratio of said impedances for a constant ratio of said loads and means responsive to departure of the ratio of said impedances from said given ratio to vary the current in said exciting winding.

9. In combination with two motors mechanically coupled to a common load, means for maintaining a given ratio between the loads carried by the two motors, said means including an alternating current bridge circuit comprising a variable impedance device for each motor, each of said impedance devices having a direct current winding in circuit with the respective motor and being adapted to vary the reactive value of said impedance device in response to the motor current while maintaining a given ratio of said reactive values for a constant ratio of said loads and means responsive to the departure of the ratio of said values from said given ratio to regulate the load of one of said motors.

10. In combination with two direct current motors connected to a common load and having an exciting winding, means for maintaining a given ratio between the loads carried by the two motors, said means including an alternating current bridge circuit comprising a variable impedance device for each motor, each of said impedance devices having a direct current winding in circuit with the respective motor and adapted to vary the reactive value of said impedance device in response to the motor current while maintaining a given ratio of said reactive values for a constant ratio of said loads and means responsive to the departure of the ratio of said values from said given ratio to vary the exciting current of one of said motors.

11. In combination with two direct current motors connected to a common load and having an exciting winding, means for maintaining a given ratio between the loads carried by the two motors, said means including an alternating current bridge circuit comprising a variable impedance device for each motor, each of said impedance devices having a direct current winding in circuit with the respective motor and adapted to vary the reactive value of said impedance device in response to the motor current, while maintaining a given ratio of said reactive values for a constant ratio of said loads, electronic means in circuit with said exciting winding and said impedance devices and means responsive to the departure of the ratio of said values from said given ratio to control said electronic means to thereby vary the exciting current of one of said motors.

12. In combination with two direct current motors connected to a common load and having an exciting winding, means for maintaining a given ratio between the loads carried by the two motors, said means including an alternating current bridge circuit comprising a variable impedance device for each motor, each of said impedance devices having a direct current winding in circuit with the respective motor and adapted to vary the reactive value of said impedance device in response to the motor current while maintaining a given ratio of said reactive values for a constant ratio of said armature current, a gaseous electron tube in circuit with one of said exciting windings and said impedance devices and means responsive to the departure of the ratio of said reactive values from said given ratio to control said gaseous electron tube to thereby vary the exciting current of one of said motors.

13. In combination with two direct current motors having armatures adapted to be connected to a common supply circuit and field windings, an alternating current supply, means for maintaining a given ratio between the loads carried by the two motors, said means including an alternating current bridge circuit comprising a variable impedance device for each motor connected to one of said field windings and said alternating current supply, each of said impedance devices having a direct current winding in circuit with the armature of the respective motor and adapted to vary the reactive value of said impedance device in response to the armature current of the respective motor while maintaining a given ratio of said reactive values for a constant ratio of said armature currents, and means responsive to the departure of the ratio of said reactive values from said given ratio to vary the exciting current of one of said motors.

14. In combination with two direct current motors having armatures adapted to be connected to a common supply circuit and field windings, an alternating current supply, means for maintaining a given ratio between the loads carried by the two motors, said means including an alternating current bridge circuit comprising a variable impedance device for each motor connected to said field winding and said alternating current supply, each of said impedance devices having a direct current winding in circuit with the armature of the respective motor and adapted to vary the reactive value of said impedance device in response to the armature current of the respective motor while maintaining a given ratio of said reactive values for a constant ratio of said armature currents, a gaseous electron tube in circuit with one of said exciting windings and said impedance devices and having a control electrode and means responsive to the departure of the ratio of said reactive values from said given ratio to control said gaseous electron tube to thereby vary the exciting current of one of said motors.

15. In combination with two direct current motors having armatures adapted to be connected to a common supply circuit and field windings, an alternating current supply, means for maintaining a given ratio between the loads carried by the two motors, said means including an alternating current bridge circuit comprising a variable impedance device for each motor connected to said field winding and said alternating current supply, each of said impedance devices having a direct current winding in circuit with the armature of the respective motor and adapted to vary the reactive value of said impedance device in response to the armature current of the respective motor while maintaining a given ratio of said reactive values for a constant ratio of said armature currents, a gaseous electron tube in circuit with one of said exciting windings and said impedance devices and having a control electrode adapted to respond to the departure of the ratio of said reactive values from said given ratio to thereby control the current of said tube and vary the exciting current of one of said motors.

CARROLL STANSBURY.